United States Patent
Sarapuk

(10) Patent No.: US 8,805,821 B2
(45) Date of Patent: Aug. 12, 2014

(54) DEFERRED COMPILATION OF STORED PROCEDURES

(75) Inventor: Andrzej Sarapuk, Argenteuil (FR)

(73) Assignee: Sybase, Inc., Dublin, CA (US)

( * ) Notice: Subject to any disclaimer, the term of this patent is extended or adjusted under 35 U.S.C. 154(b) by 655 days.

(21) Appl. No.: 12/346,053

(22) Filed: Dec. 30, 2008

(65) Prior Publication Data

US 2010/0010962 A1    Jan. 14, 2010

Related U.S. Application Data

(60) Provisional application No. 61/079,500, filed on Jul. 10, 2008.

(51) Int. Cl.
*G06F 17/30* (2006.01)
*G06F 9/45* (2006.01)
*G06F 7/00* (2006.01)

(52) U.S. Cl.
CPC .................................... *G06F 8/443* (2013.01)
USPC ............................ 707/718; 707/688; 707/721

(58) Field of Classification Search
USPC ............ 717/106, 124; 719/328; 707/999.001, 707/999.204, 999.103, 721, 718, 688
See application file for complete search history.

(56) References Cited

U.S. PATENT DOCUMENTS

| | | | | |
|---|---|---|---|---|
| 6,324,683 | B1 * | 11/2001 | Fuh et al. | 717/124 |
| 6,978,261 | B2 * | 12/2005 | Cotner et al. | 707/999.001 |
| 7,047,535 | B2 * | 5/2006 | Lee et al. | 719/328 |
| 7,149,752 | B2 * | 12/2006 | Mangan | 707/999.103 |
| 7,318,215 | B1 * | 1/2008 | Krishnan et al. | 717/106 |
| 7,809,694 | B2 * | 10/2010 | Nelson | 707/688 |
| 7,877,377 | B2 * | 1/2011 | Day et al. | 707/718 |
| 2006/0230083 | A1 * | 10/2006 | Allyn et al. | 707/204 |

* cited by examiner

*Primary Examiner* — Sathyanarayan Pannala
(74) *Attorney, Agent, or Firm* — Sterne, Kessler, Goldstein & Fox P.L.L.C.

(57) ABSTRACT

A system, method, and computer program product are provided for compiling a stored procedure in a database. The compiling includes the steps of invoking the stored procedure, the stored procedure comprising one or more statements, substituting run-time values for one or more variables in the statements, and creating an access plan for the statements having the substituted run-time values.

15 Claims, 6 Drawing Sheets

DEFERRED COMPILATION OF STORED PROCEDURES

CROSS-REFERENCE TO RELATED APPLICATIONS

The present application claims the benefit of U.S. Provisional Application No. 61/079,500, filed on Jul. 10, 2008, titled "Deferred Compilation of Stored Procedures", which is incorporated herein by reference in its entirety.

BACKGROUND OF INVENTION

1. Field of the Invention

The present invention relates generally to databases and, more specifically, to stored procedures in a database.

2. Description of the Background Art

Modern database systems commonly allow users to write procedures that are stored on the database themselves. These procedures are usually a set of one or more statements grouped together as a procedure, which allows the procedure to be called whenever this set of statements needs to be run.

Database systems also commonly perform optimizations to these procedures, as well as the statements that comprise them, in order to enable them to run more efficiently during execution time. One such optimization is the creation of access plans, which instruct the system on how to retrieve the data needed to process a statement. For example, if a statement only needs part of a table from a database in order to perform some computation, an access plan is created which retrieves only the needed part of the table.

However, sometimes these statements include variables or other information which is only known at run-time. Accordingly, when these optimizations are performed, an optimizer has to make certain guesses at what the data will be. This can result in inadequate performance.

Accordingly, what is desired is a method to improve the optimization of stored procedures.

SUMMARY OF INVENTION

Embodiments of the invention include a method for compiling a stored procedure in a database. The method includes the steps of invoking the stored procedure, the stored procedure comprising one or more statements, substituting run-time values for one or more variables in the statements, and creating an access plan for the statements having the substituted run-time values.

Additional embodiments of the invention include a system for compiling a stored procedure in a database. The system includes an invoking module to invoke the stored procedure, the stored procedure comprising one or more statements, a substituting module to substitute run-time values for one or more variables in the statements, and a creating module to create an access plan for the statements having the substituted run-time values.

Further embodiments of the invention include a computer program product comprising a computer-usable medium having computer program logic recorded thereon for enabling a processor to compile a stored procedure in a database. The computer program logic includes invoking means for enabling a processor to invoke the stored procedure, the stored procedure comprising one or more statements, substituting means for enabling a processor to substitute run-time values for one or more variables in the statements, and creating means for enabling a processor to create an access plan for the statements having the substituted run-time values.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
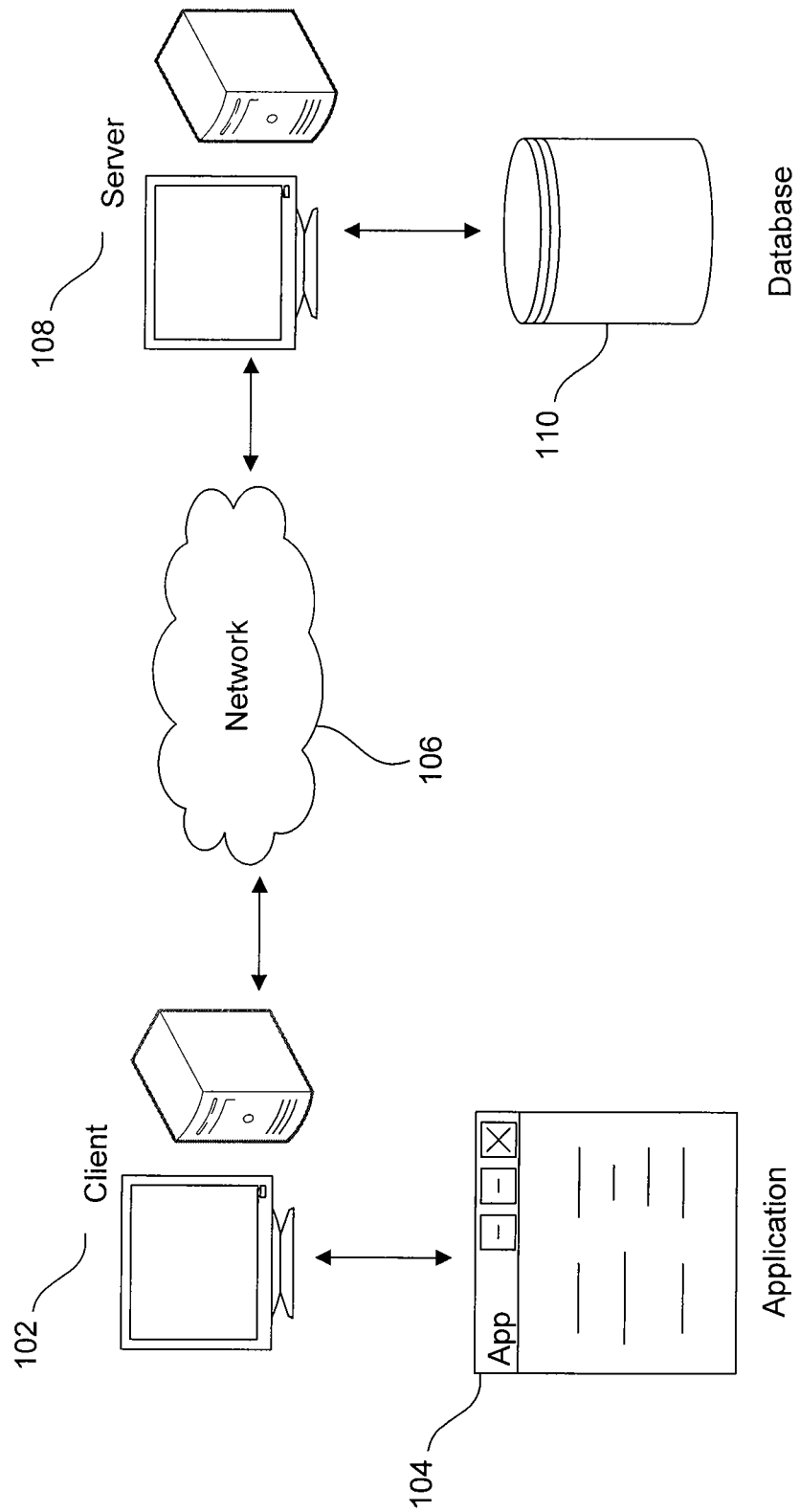
FIG. 1 illustrates a network in which the present invention, or portions thereof, can be implemented, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Moreover, one of skill in the art will appreciate that the term "optimize," and variants thereof, throughout this specification refers to identifying a solution that is computationally more efficient than other solutions to which it is compared, and not necessarily the most efficient solution mathematically possible, although it may include such a solution.

FIG. 1 is a network 100 in which the present invention, or portions thereof, can be implemented. In accordance with an embodiment of the present invention, client 102 communicates over network 106 with server 108. Client 102 runs an application 104 that requests data from a database 110 at server 108. In accordance with an additional embodiment of the present invention, application 104 and database 110 are located within a same computer or cluster of computers, such as either client 102 or server 108, and therefore communicate locally without the need for network 106. In accordance with a further embodiment of the present invention, application 104 is substituted by a user at client 102 directly inputting commands for server 108 in order to interact with database 110. One skilled in the relevant arts will appreciate that numerous configurations exist in which the present invention may be implemented, and that the network 100 of FIG. 1 is shown by way of example, and not limitation.

Further embodiments of the present invention will be subsequently described with continued reference to FIG. 1

II. Stored Procedures

Figure 2:
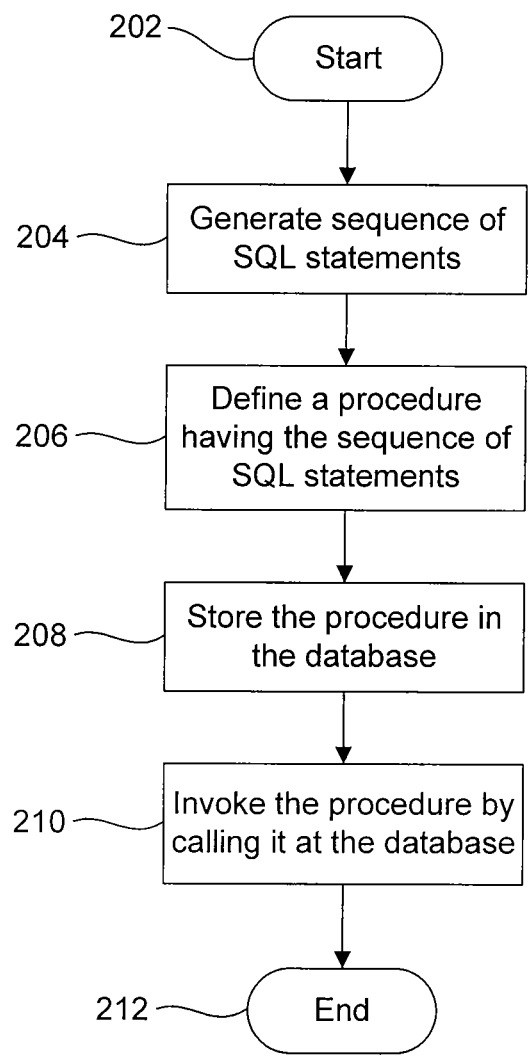
FIG. 2 is a flowchart illustrating steps by which a stored procedure in a database is created and utilized, in accordance with an embodiment of the present invention.

FIG. 2 is a flowchart 200 illustrating steps by which a stored procedure in a database, such as database 110, is created and utilized, in accordance with an embodiment of the present invention. The flowchart begins at step 202 and proceeds to step 204 where a sequence of Structured Query Language ("SQL") statements is generated. In accordance with an embodiment of the present invention, the sequence of SQL statements is entered by a user at client 102. In accordance with an additional embodiment of the present invention, the sequence of SQL statements is provided by application 104. One skilled in the relevant arts will appreciate that the sequence of SQL statements may originate from a number of sources, including user input or creation by another software component, and the aforementioned examples are provided Moreover, one skilled in the relevant arts will further appreciate that the use of SQL statements is by way of example, and not limitation, such that additional embodiments of the present invention exist for the implementation of other database languages.

At step 206, a procedure is defined, the procedure comprising the aforementioned SQL statements, in accordance with an embodiment of the present invention. In an embodiment, the procedure is declared using a procedure declaration statement, the declaration statement including a name for the procedure. Subsequently, in an embodiment, the sequence of SQL statements are provided as the body of the procedure, after which some indication is provided that the end of the procedure is reached. At step 208, the procedure, including, in an embodiment, the declaration statement and the sequence of SQL statements comprising the procedure, are stored into a database, such as database 110.

Subsequently, at step 210, the procedure stored at step 208 is invoked, in accordance with an embodiment of the present invention. A stored procedure may be invoked a number of times, or not at all, depending on how it is needed by a calling application or a user manually calling the procedure. The method ends at step 212.

In accordance with an embodiment of the present invention, the procedure is defined by application 104 and subsequently stored, at step 208, by providing the procedure to server 108 for storage into database 110. In accordance with an additional embodiment of the present invention, the procedure is stored a priori in database 110 for use by application 104. One skilled in the relevant arts will appreciate that other automatic and manual means of creating and storing the procedure in a database, such as database 110, exist, and the aforementioned means are provided by way of example, and not limitation.

With the procedure stored at step 208, it may be invoked from database 110 by application 104 as it is needed, in accordance with an embodiment of the present invention. In an embodiment, application 104 issues an instruction to server 108 for execution on database 110 to invoke, or call, the stored procedure from database 110. In an additional embodiment of the present invention, the stored procedure is invoked by another procedure running on server 108. One skilled in the relevant arts will appreciate that the step of invoking the procedure 210 can be initiated from a variety of manual or automatic sources, and the aforementioned invocations are provided by way of example, and not limitation.

III. Optimization of Stored Procedures

Figure 3:
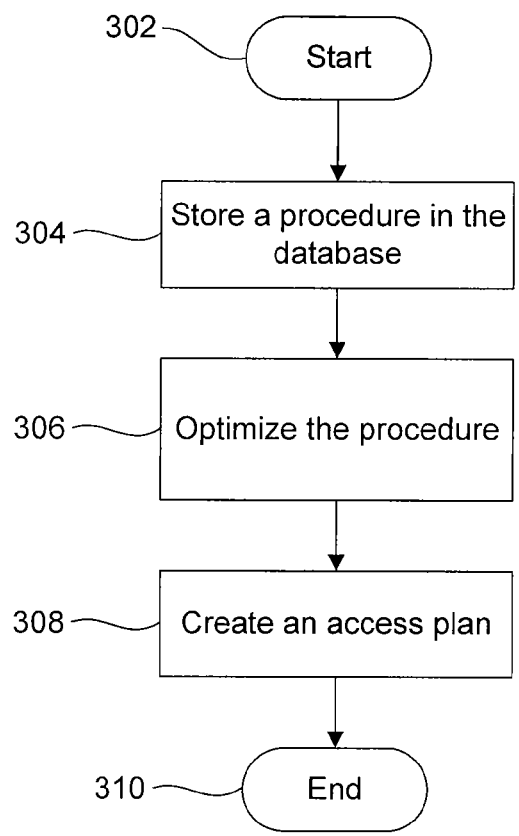
FIG. 3 is a flowchart illustrating steps by which procedures are traditionally optimized in a database.

FIG. 3 is a flowchart 300 illustrating steps by which procedures are traditionally optimized in a database. The method starts at step 302 and proceeds to step 304, where a procedure is stored in the database. Responsive to storing the procedure in the database, the procedure is optimized at step 306 and an access plan is created at step 308. The method ends at step 310.

In the event that one or more of the SQL statements comprising the stored procedure in flowchart 300 includes variables, the optimization of step 306 and the creation of the access plan at step 308 will likely introduce inefficiencies. For example, in the following exemplary SQL instruction set:

```
create procedure P1
as
declare @a int
select @a = max(col) from t
select * from tab1 where col = @a
go
exec P1
go
``` a procedure, P1, is defined which includes reference to an integer variable, @a. Prior to execution of the procedure, the value of @a is unknown. Accordingly, in the traditional optimization means, the statement "select * from tab1 where col=@a" is unlikely to result in the creation of an efficient access plan at step 308, because the unknown value of the variable @a during query optimization is likely to lead to incorrect estimation of the selectivity of the WHERE clause. Correct estimation of the selectivity is useful to optimize the query efficiently.

In a further example,

```
create procedure P2
as
create table #a (col1 int)
insert table # values(1)
select * from tab1, #a where col1 = col2
go
exec P2
go
``` if the query refers to a temporary table created in the same store procedure, such as in the statement "select * from #a, tab1, where col1=col2", then the optimization of this statement is performed without knowledge of the size of the table #a at runtime. Accordingly, the optimizer will, for example, assume a table size for #a in optimizing the statement and creating an access plan at steps 306 and 308, respectively, which likely will result in inefficiencies.

Figure 4:
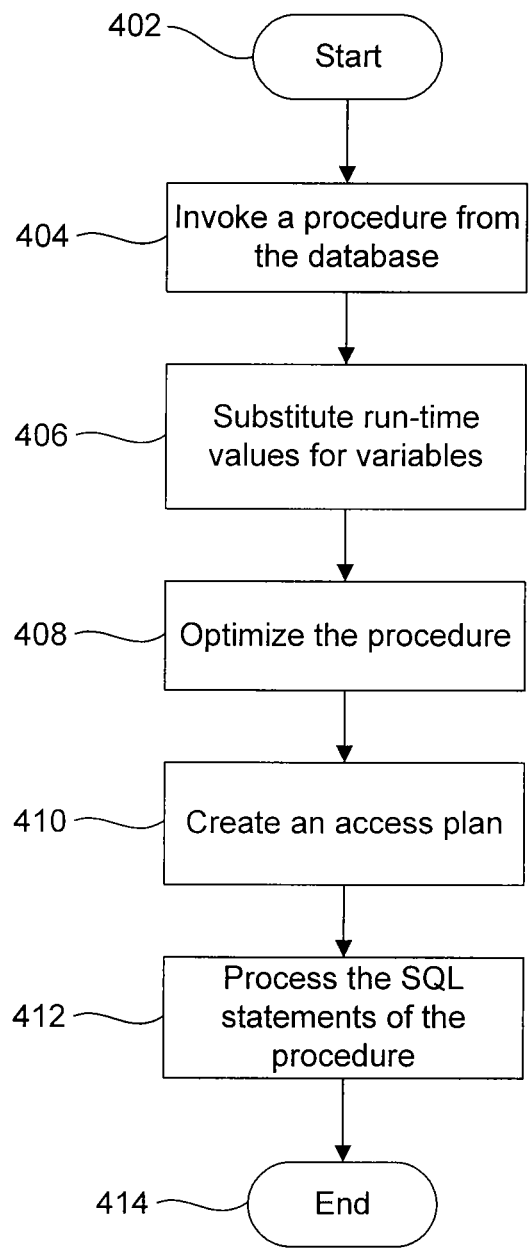
FIG. 4 is a flowchart of an improved method for optimizing a stored procedure and creating an access plan, in accordance with an embodiment of the present invention.

FIG. 4 is a flowchart 400 of an improved method for optimizing a stored procedure and creating an access plan, in accordance with an embodiment of the present invention. The method starts at step 402 and proceeds to step 404 where a stored procedure is invoked from the database. In accordance with an embodiment of the present invention, the execution of the procedural statement from the stored procedure at step 404 occurs at run-time (e.g., in the middle of the procedure execution) and therefore run-time values for variables established prior to the currently executed procedural statement are known at the time the procedural statement is invoked. Similarly, the size of any temporary tables created and populated in the stored procedure prior to the execution of the current statement is known.

Accordingly, at step 406, run-time values are substituted for any variables assigned by statements executed prior to the currently executed procedural statement. Subsequent to the substitution, the procedural statement is optimized using values for substituted variables at step 408, and an access plan for this statement is created at step 410.

The optimization of the statement using runtime substituted values of variables considerably reduces the possibility of generating an inefficient access plan by the optimizer. After optimization and the creation of the access plan, the SQL statements comprising the procedure are processed at step 412, and the method ends at step 414. This process of optimization and creation of an access plan for a procedural statement at run-time, just before the statement execution is referred to in this specification as the process of deferred compilation.

In accordance with an embodiment of the present invention, the optimization of step 408 and the access plan created at step 410 are stored for later reuse such as, for example, if the stored procedure is invoked a second or subsequent time. In accordance with an additional embodiment of the present invention, a particular stored procedure is marked according to whether or not the deferred compilation methodology should be applied to the stored procedure.

IV. Additional Refinements

In accordance with an additional embodiment of the present invention, the traditional methodology and the deferred compilation methodology are combined in order to further refine the optimization of stored procedures and the creation of access plans for the same.

Figure 5:
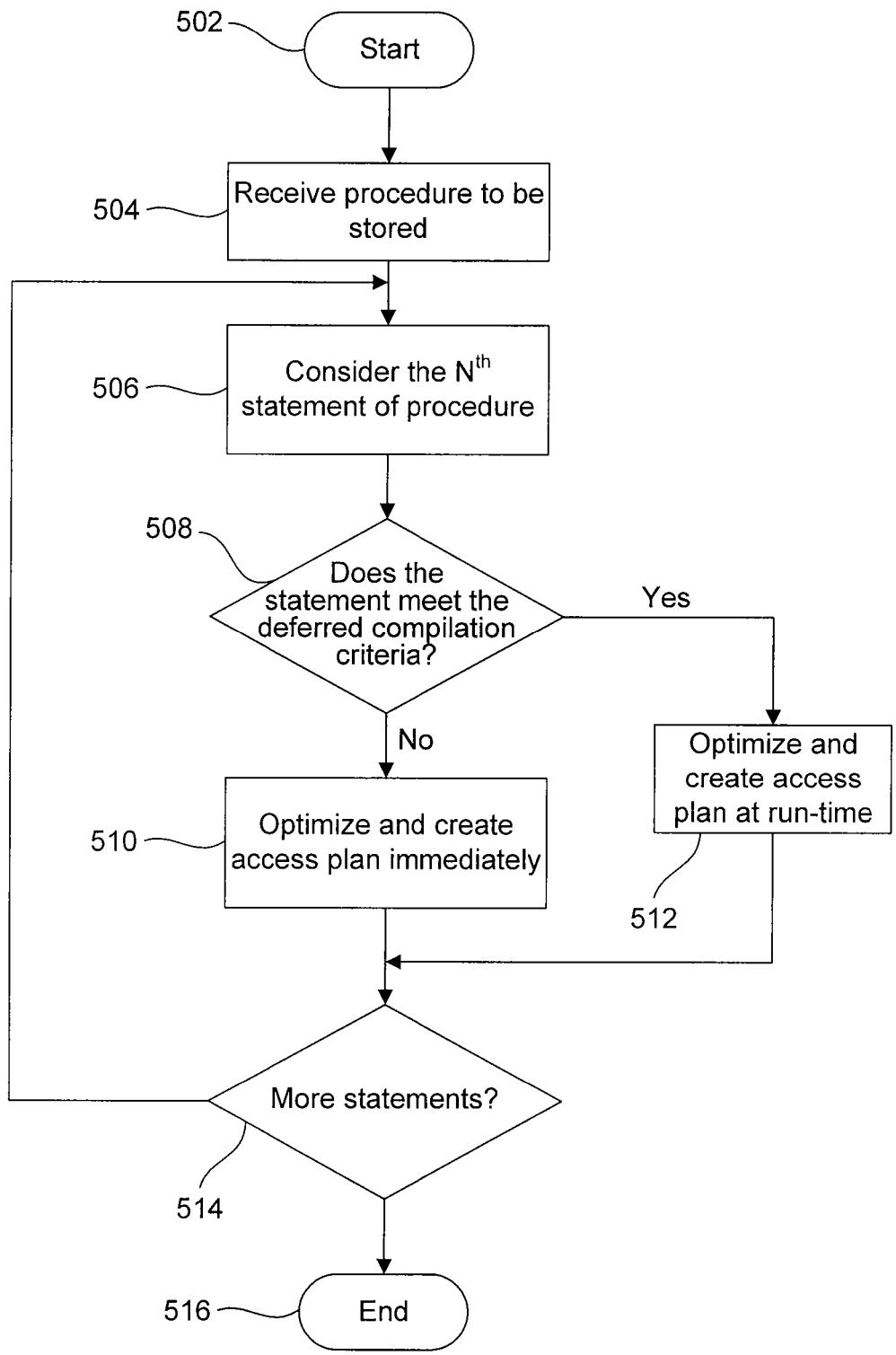
FIG. 5 is a flowchart illustrating steps by which the traditional methodology and the deferred compilation methodology are applied based on which methodology provides the greatest computational efficiencies, in accordance with an embodiment of the present invention.

FIG. 5 is a flowchart 500 illustrating steps by which the traditional methodology and the deferred compilation methodology are applied based on which methodology provides the greatest computational efficiencies, in accordance with an embodiment of the present invention. The method begins at step 502 and proceeds to step 504 where a procedure to be stored is received. In accordance with an embodiment of the present invention, the procedure to be stored is received at a database server, such as server 108. One skilled in the relevant arts will appreciate that procedures may be received for storage and optimization at other modules in a database system, and the aforementioned configuration is presented by way of example, and not limitation.

At step 506, the Nth statement of the procedure to be stored is analyzed, in accordance with an embodiment of the present invention. For example, if a procedure includes five SQL statements, the zeroth statement is considered during the first performance of step 506, then the first, the second, etc. One skilled in the relevant arts will appreciate that the statements comprising the procedure may be considered in any order.

During step 508, it is determined whether the statement under consideration meets one or more criteria for deferred compilation, in accordance with an embodiment of the present invention. In accordance with an embodiment, the criteria for deferred compilation is met when the statement includes a variable or parameter. In accordance with an additional embodiment of the present invention, the criteria for deferred compilation is met when the statement involves a JOIN operation with a temporary table created in the same procedure to which the statement belongs. One skilled in the relevant arts will appreciate that other criteria exist for selecting when it is beneficial to apply deferred compilation to a statement.

If the statement does not meet the criteria used for determining whether to apply deferred compilation at step 508, then at step 510 the statement is optimized and an access plan for the statement is created immediately, as in the traditional methodology. These optimizations and the access plan are integrated into the optimization and access plan for the stored procedure, in accordance with an embodiment of the present invention.

On the other hand, if the statement does meet the criteria used for determining whether to apply deferred compilation at step 508, then compilation, and therefore the optimization of, and the creation of an access plan for, the statement is deferred until the procedure is invoked at run-time at step 512. At step 514, if any additional statements remain to be analyzed in the procedure, control returns to step 506. The method ends at step 516.

V. Example Computer System Implementation

Figure 6:
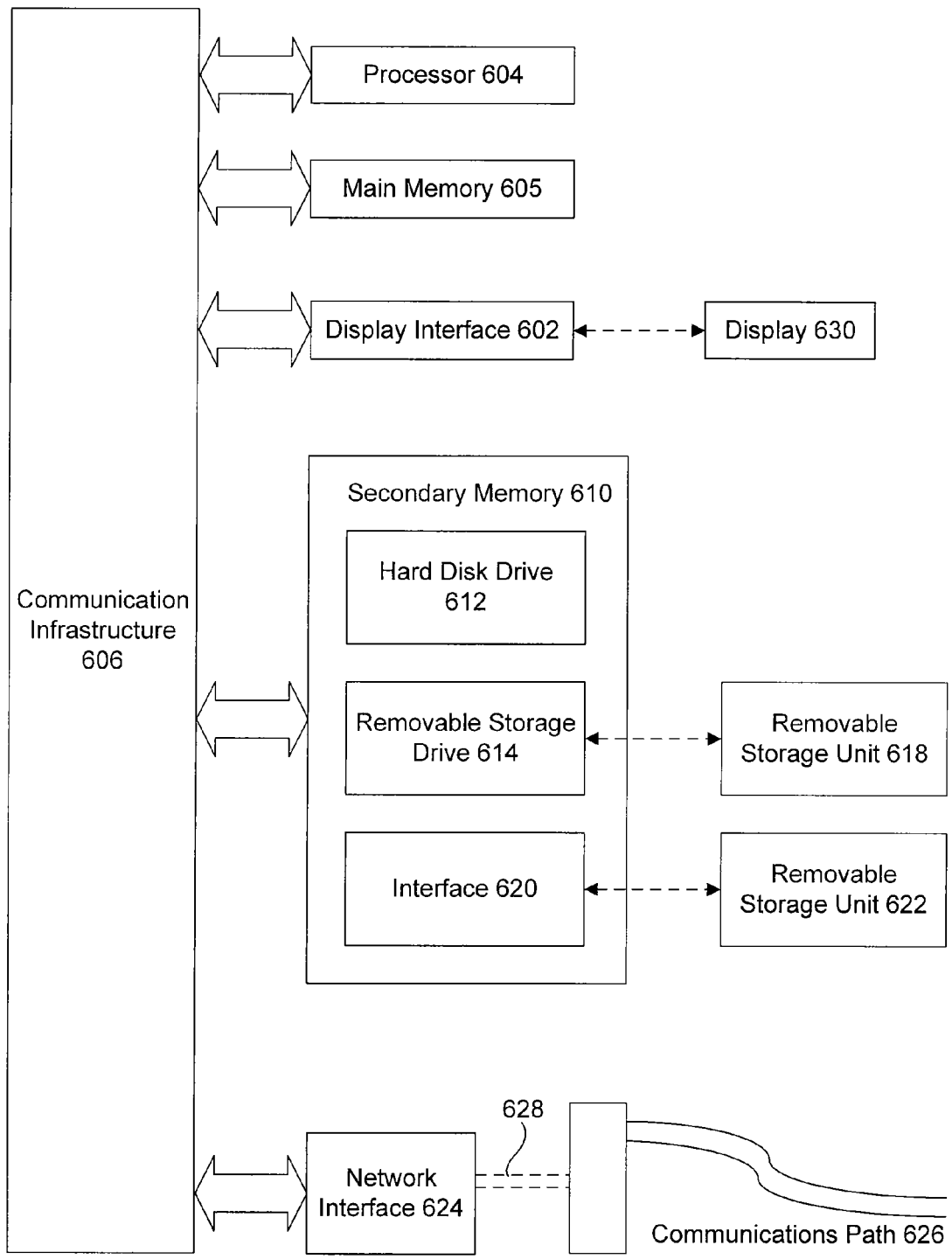
FIG. 6 depicts an example computer system in which embodiments of the present invention may be implemented.

Various aspects of the present invention can be implemented by software, firmware, hardware, or a combination thereof. FIG. 6 illustrates an example computer system 600 in which the present invention, or portions thereof, can be implemented as computer-readable code. For example, the methods illustrated by flowcharts 200 of FIG. 2, 300 of FIG. 3, 400 of FIG. 4, and 500 of FIG. 5, can be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. which is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals which may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor 604 to implement the processes of the present invention, such as the steps in the methods illustrated by flowcharts 200 of FIG. 2, 300 of FIG. 3, 400 of FIG. 4, and 500 of FIG. 5, discussed above. Accordingly, such computer programs represent controllers of the computer system 600. Where the invention is implemented using software, the software may be stored in a computer program product and loaded into computer system 600 using removable storage drive 614, interface 620, hard drive 612 or communications interface 624.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
invoking a stored procedure in a database, the stored procedure comprising one or more uncompiled database query statements marked for deferred compilation until the stored procedure is invoked at run-time, wherein at least one of the uncompiled database query statements includes one or more variables, and wherein statements marked for deferred compilation are selected for marking based on deferred compilation criteria;
substituting, at run-time, run-time values for the one or more variables in the statements; and
creating, at run-time, an access plan for the statements, wherein the access plan accounts for the statements having the substituted run-time values.

2. The method of claim 1, further comprising:
optimizing the stored procedure.

3. The method of claim 1, further comprising:
processing the statements.

4. The method of claim 1, wherein the deferred compilation criteria comprises whether a statement includes a variable or parameter.

5. The method of claim 1, wherein the deferred compilation criteria comprises whether a statement includes a JOIN operation with a temporary table created in the stored procedure.

6. A system comprising:
a memory configured to store modules comprising:
an invoking module to invoke a stored procedure in a database, the stored procedure comprising one or more uncompiled database query statements marked for deferred compilation until the stored procedure is invoked at run-time, wherein at least one of the uncompiled database query statements includes one or more variables, and wherein statements marked for deferred compilation are selected for marking based on deferred compilation criteria,
a substituting module to substitute, at run-time, run-time values for one or more variables in the statements, and
creating, at run-time, an access plan for the statements, wherein the access plan accounts for the statements having the substituted run-time values; and
one or more processors configured to process the modules.

7. The system of claim 6, further comprising:
an optimizing module to optimize the stored procedure.

8. The system of claim 6, further comprising:
a processing module to process the statements.

9. The system of claim 6, wherein the deferred compilation criteria comprises whether a statement includes a variable or parameter.

10. The system of claim 6, wherein the deferred compilation criteria comprises whether a statement includes a JOIN operation with a temporary table created in the stored procedure.

11. A computer-usable medium having computer-executable instructions stored thereon for compiling a stored procedure in a database, execution of which, by a computing device, causes the computing device to perform operations comprising:

invoking the stored procedure, the stored procedure comprising one or more uncompiled database query statements marked for deferred compilation until the stored procedure is invoked at run-time, wherein at least one of the uncompiled database query statements includes one or more variables, and wherein statements marked for deferred compilation are selected for marking based on deferred compilation criteria;

substituting, at run-time, run-time values for one or more variables in the statements; and creating, at run-time, an access plan for the statements, wherein the access plan accounts for the statements having the substituted run-time values.

12. The computer-usable medium of claim 11, the operations further comprising:

optimizing the stored procedure.

13. The computer-usable medium of claim 11, the operations further comprising:

processing the statements.

14. The computer-usable medium of claim 11, wherein the deferred compilation criteria comprises whether a statement includes a variable or parameter.

15. The computer-usable medium of claim 11, wherein the deferred compilation criteria comprises whether a statement includes a JOIN operation with a temporary table created in the stored procedure.

* * * * *